US008744960B2

(12) United States Patent
Lister

(10) Patent No.: US 8,744,960 B2
(45) Date of Patent: Jun. 3, 2014

(54) METHODS AND SYSTEMS FOR BUSINESS-TO-BUSINESS ELECTRONIC PAYMENT PROCESSING

(75) Inventor: James E. Lister, Coral Springs, FL (US)

(73) Assignee: First Data Corporation, Greenwood Village, CO (US)

( * ) Notice: Subject to any disclaimer, the term of this patent is extended or adjusted under 35 U.S.C. 154(b) by 906 days.

(21) Appl. No.: 12/247,835

(22) Filed: Oct. 8, 2008

(65) Prior Publication Data

US 2010/0088206 A1 Apr. 8, 2010

(51) Int. Cl.
*G06Q 40/00* (2012.01)
*G07B 17/00* (2006.01)
*G07F 19/00* (2006.01)

(52) U.S. Cl.
USPC .......... 705/40; 705/30; 705/42; 705/44

(58) Field of Classification Search
USPC .................. 705/25–30, 40
See application file for complete search history.

(56) References Cited

U.S. PATENT DOCUMENTS

| 6,092,053 | A | 7/2000 | Boesch et al. | |
|---|---|---|---|---|
| 6,295,522 | B1 | 9/2001 | Boesch | |
| 6,324,525 | B1* | 11/2001 | Kramer et al. | 705/40 |
| 2002/0052841 | A1* | 5/2002 | Guthrie et al. | 705/40 |
| 2002/0156727 | A1* | 10/2002 | LeVake et al. | 705/39 |
| 2003/0126094 | A1* | 7/2003 | Fisher et al. | 705/75 |
| 2005/0086136 | A1* | 4/2005 | Love et al. | 705/30 |
| 2005/0234817 | A1 | 10/2005 | VanFleet et al. | |
| 2005/0234820 | A1* | 10/2005 | MacKouse | 705/40 |
| 2005/0234822 | A1 | 10/2005 | VanFleet et al. | |
| 2005/0234833 | A1 | 10/2005 | VanFleet et al. | |
| 2006/0074799 | A1* | 4/2006 | Averyt et al. | 705/40 |
| 2007/0282743 | A1* | 12/2007 | Lovelett et al. | 705/40 |

* cited by examiner

*Primary Examiner* — Ig T An
(74) *Attorney, Agent, or Firm* — Kilpatrick Townsend & Stockton LLP

(57) ABSTRACT

Embodiments presented herein address the shortcomings and problems discussed above by providing systems and methods for a central system that conducts business-to-business (B2B) payments. In embodiments, a B2B gateway receives payment instructions from one or more buyers. The payment instructions may be received over one of several different systems, for example, a credit card association system or an electronic invoice presentment and payment (EIPP) system. The B2B gateway organizes the payment instructions according to the supplier being paid and the payment system that will be used for the payment. The payment systems may include, but are not limited to, credit card platforms, ACH payments, mailed checks, etc. The suppliers can receive two or more payments from two or more buyers through the B2B gateway.

11 Claims, 11 Drawing Sheets

METHODS AND SYSTEMS FOR BUSINESS-TO-BUSINESS ELECTRONIC PAYMENT PROCESSING

BACKGROUND

Businesses generally engage in agreements to purchase goods or services. For example, a retail business purchases items from one or more distributors to sell to the business' patrons. The purchase requires the buyer to pay the seller for the service or good. To pay for the good or service, the buyer may use one or more forms of payment or payment system. For example, the buyers and sellers may use an automated transfer between banks using the Automated Clearing House (ACH) network, a credit card using VISA™, MASTER-CARD™, or other credit card system, a check, etc.

Generally, each buyer may use a different system to pay for goods or services, and each seller may use a different system to accept payment for goods or services. For example, one seller may accept credit card purchases while another seller may only accept checks. Unfortunately, this diversity between buyers, between sellers, and between buyers and sellers costs money for both buyers and sellers because the sellers and buyers must determine acceptable forms of payment and often convert payment from one form to another. Further, the varying payment systems can have different costs or one form of a payment may be more efficient or effective than another payment system.

It is in view of these and other considerations not mentioned herein that the embodiments of the present disclosure were envisioned.

BRIEF SUMMARY

Embodiments presented herein address the shortcomings and problems discussed above by providing systems and methods for a central system that conducts business-to-business (B2B) payments. In embodiments, a B2B gateway receives payment messages from one or more buyers. Each buyer may use a buyer accounts payable system in their accounting software. The payment messages may be received over one of several different systems, for example, a credit card association system, or an electronic invoice presentment and payment (EIPP) system. The B2B gateway organizes the payment messages according to the supplier being paid and the payment system that will be used for the payment. The payment systems may include, but are not limited to, credit card platforms, ACH payments, mailed checks, etc. The suppliers can receive two or more payments from two or more buyers through the B2B gateway. In embodiments, the B2B gateway also receives authorization and/or confirmation messages from the payment systems and/or suppliers that payments have been authorized or completed. The authorization and/or confirmation messages may be organized by the B2B gateway and sent to the buyers.

BRIEF DESCRIPTION OF THE DRAWINGS

The embodiments of the present disclosure are described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide unique and novel systems and methods for business-to-business (B2B) payments. In embodiments, the buyer submits one or more sets of payment instructions to a gateway. The gateway determines one of two or more payment systems to use for the payment instructions. The gateway then sends the payment instructions to the determined system, which pays the supplier using the determined system.

As an example, a hardware store (for example, Home Depot) may purchase 10 drills from Hitachi Power Tools and 10 saws from Black and Decker. The hardware store can batch the payments instructions and send the payment instructions to the gateway. The gateway can determine, from information in the batch payments, which payment systems are to be used for the payment instructions. For example, an identifier in the batch payment information can show that the payment to Hitachi is a credit card payment using the VISA™ network and the payment to Black and Decker is a bank transfer using the automated clearing house (ACH) network. The gateway parses the batch payments and sends the payment for Hitachi over the VISA™ network to pay Hitachi. Likewise, the gateway sends the payment for Black and Decker over the ACH to pay Black and Decker.

Figure 1:
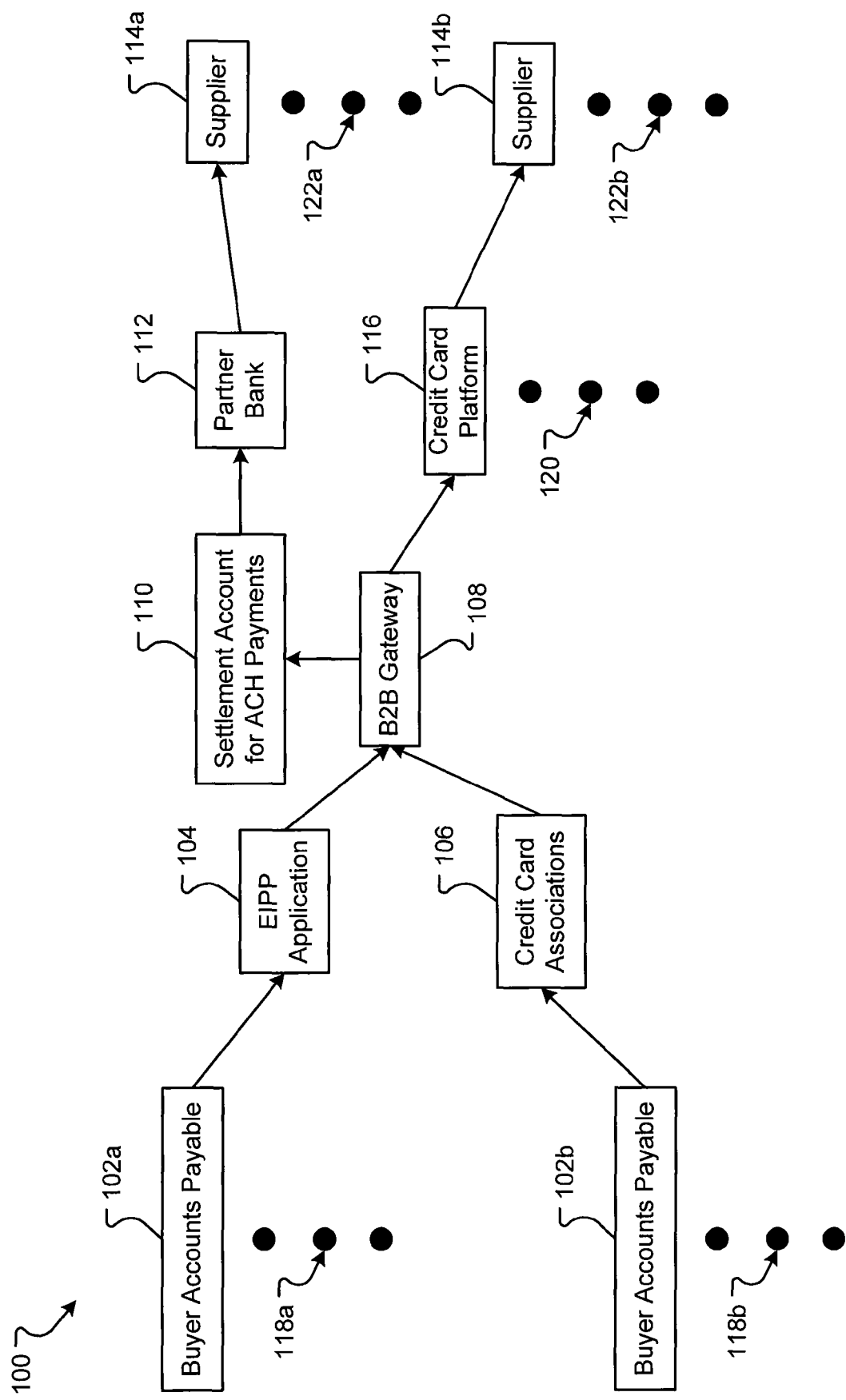
FIG. 1 is a block diagram of an embodiment of a system for transferring business-to-business (B2B) payments through a B2B gateway.

An embodiment of a system 100 operable to facilitate B2B payments is shown in FIG. 1. In embodiments, the one or more components or systems are computing systems as described in conjunction with FIG. 10. The components may be hardware, software, or a combination of hardware and software operable to perform the functions described herein. The one or more components may be in communication with each other over an intranet, the Internet (e.g., the World Wide Web), or other network. The components can use any protocol, standard, or form of communication operable to allow the components to perform the functions described herein. In embodiments, the system 100 comprises one or more buyer accounts payable systems 102 (also referred to simply as "buyer"), an electronic invoice presentment and payment (EIPP) system 104, a credit card association system 106, a B2B gateway 108, one or more credit card platforms 116, one or more settlement accounts 110 for ACH payments, one or more partner banks 112, and one or more suppliers 114 (also referred to simply as "seller").

The buyer accounts payable 102, in embodiments, are accounting systems executed by one or more servers for one or more buyers. A buyer may be any business or entity that buys goods or services from a supplier 114. The accounting systems can be any accounting software program that can send requests or instructions for payments to one or more networks. The payment instructions, in embodiments, are messages having a native format to the accounting software system. Each accounting system may have a unique payment message format. There may be two or more buyer accounts payable 102 as represented by the ellipses 118a and 118b.

In embodiments, one or more payment instructions for one or more buyers is sent over an EIPP application 104. The EIPP application 104 may be any system that can accept payment instructions for an ACH payment or other type of payment. The format of instructions for the EIPP application 104 can have a standard format for the particular EIPP application 104. The standard format may be an industry standard format or a proprietary format. In embodiments, the EIPP application 104 forwards the payment instructions from one or more buyer accounts payable 102a to a central B2B gateway 108.

One or more buyer accounts payable 102, in embodiments, uses credit card transactions to pay suppliers 114. In embodiments, the buyer accounts payable 102b sends credit card payment instructions to one or more credit card associations 106. A credit card association 106 may be a credit payment network, for example, VISA™, MASTERCARD™, etc. The format of instructions for the credit card association 106 can have a standard format for the particular credit card association 106. In embodiments, the credit card association 106 forwards the credit card payment instructions from one or more buyer accounts payable 102a to a central B2B gateway 108.

The B2B gateway 108, in embodiments, is a central computing system operable to receive payment instructions from one or more buyer accounts payable 102 through the EIPP application 104 or the credit card association 106. In other embodiments, the B2B gateway 108 receives the payment instructions directly from the one or more buyer accounts payable 102. In embodiments, the B2B gateway 108 also receives payment messages from one or more other systems from one or more other buyer accounts payable 102. The B2B gateway 108 can determine from the payment instructions the supplier 114 to which the payments are directed. Further, the B2B gateway 108 may also determine which type of payment system or method is to be used for the payment. For example, the B2B gateway 108 receives a message from a buyer accounts payable 102 through the credit card association 106. The message can indicate a type of credit card platform 116 to use for the payment. In another example, the B2B gateway 108 receives a message from a buyer accounts payable 102 through the EIPP application 104 and sends the message to a settlement account 110 for ACH payments. Embodiments of the B2B gateway 108 are described in conjunction with FIGS. 2A and 2B.

A credit card platform 116, in embodiments, is the system and/or network for processing credit card transactions. There may be two or more credit card platforms 116 as represented by the ellipses 120. The credit card platform 116 may accept all credit card transactions for a region, for example, the Midwest region. In other embodiments, the credit card platform 116 may be segmented by currency type, e.g., U.S. dollars, Euros, Yen, etc. Other embodiments of the credit card platforms 116 may be segmented by industry, for example, builders, food suppliers, etc. The credit card platform 116 can process the crediting of one or more suppliers accounts 114b from funds debited from the credit card accounts of one or more buyer accounts payable 102.

The settlement account 110, in embodiments, is an account for conducting ACH payment on behalf of the one or more buyer accounts payable 102. The ACH system used may be segmented by region to ensure faster processing. In embodiments, the B2B gateway 108 can send a payment instruction to have a partner bank 112 credit the settlement account from one or more buyer accounts payable 102. Then, the partner bank 112 may make a payment from the settlement account 110 to one or more suppliers accounts 114a. The timeframes for the payment may depend on type of payment being made. The timeframe for payment may be a couple of hours, ca couple of days, etc.

Supplier 114 can be any computing system executing an accounting system for one or more suppliers. A supplier 114 may be any entity that provides goods or services to the buyers. The accounting systems can be any accounting software program that can receive payments from one or more networks and/or send authorizations or confirmations of payments over the one or more networks. The authorizations or confirmations, in embodiments, are messages having a native format to the accounting software system of the supplier 114. Each accounting system may have a unique authorization or confirmation format. In embodiments, there may be two or more suppliers 114 as represented by the ellipses 122a and 122b.

Figure 2A:
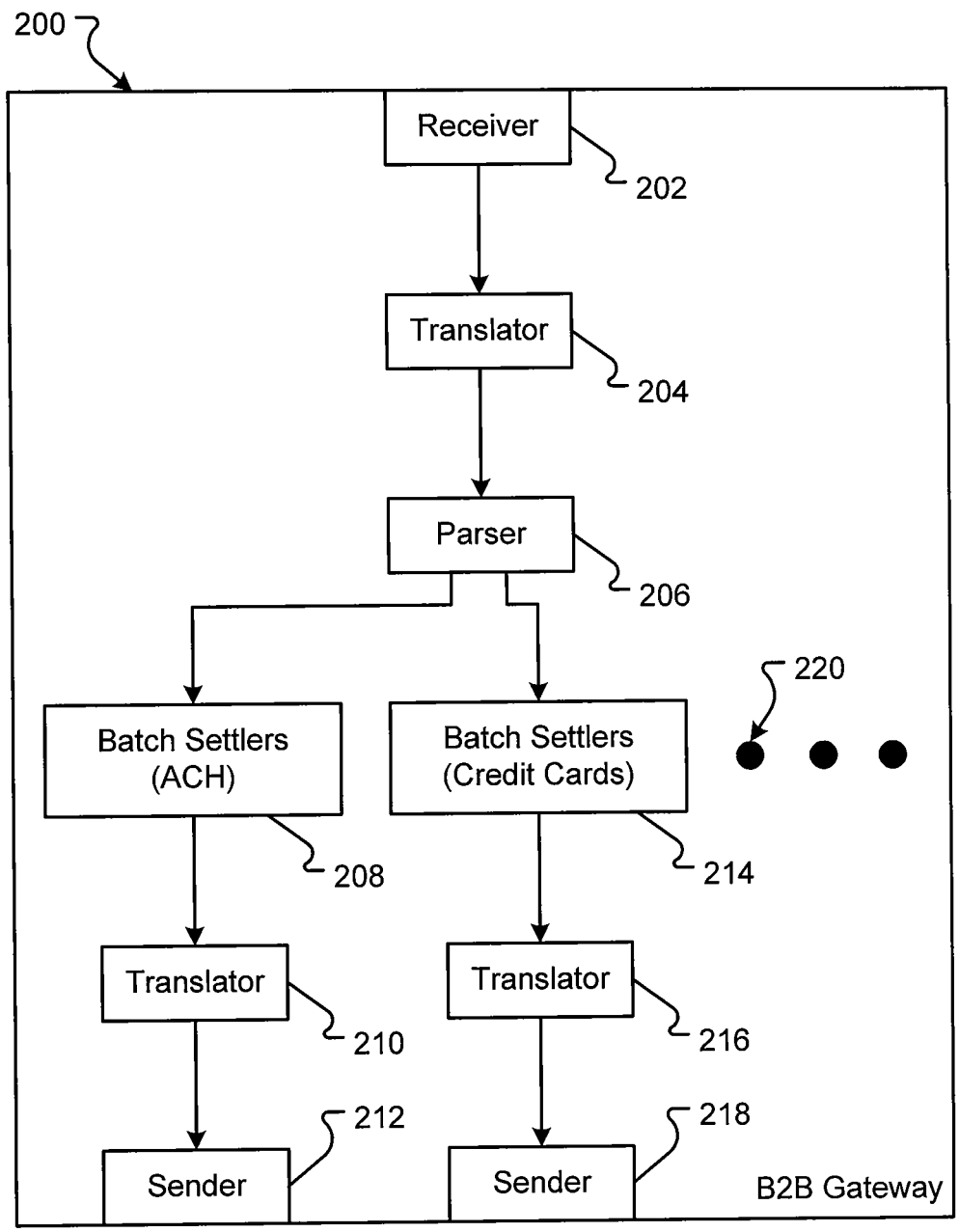
FIGS. 2A and 2B are block diagrams of embodiments of a B2B gateway.
Figure 2B:
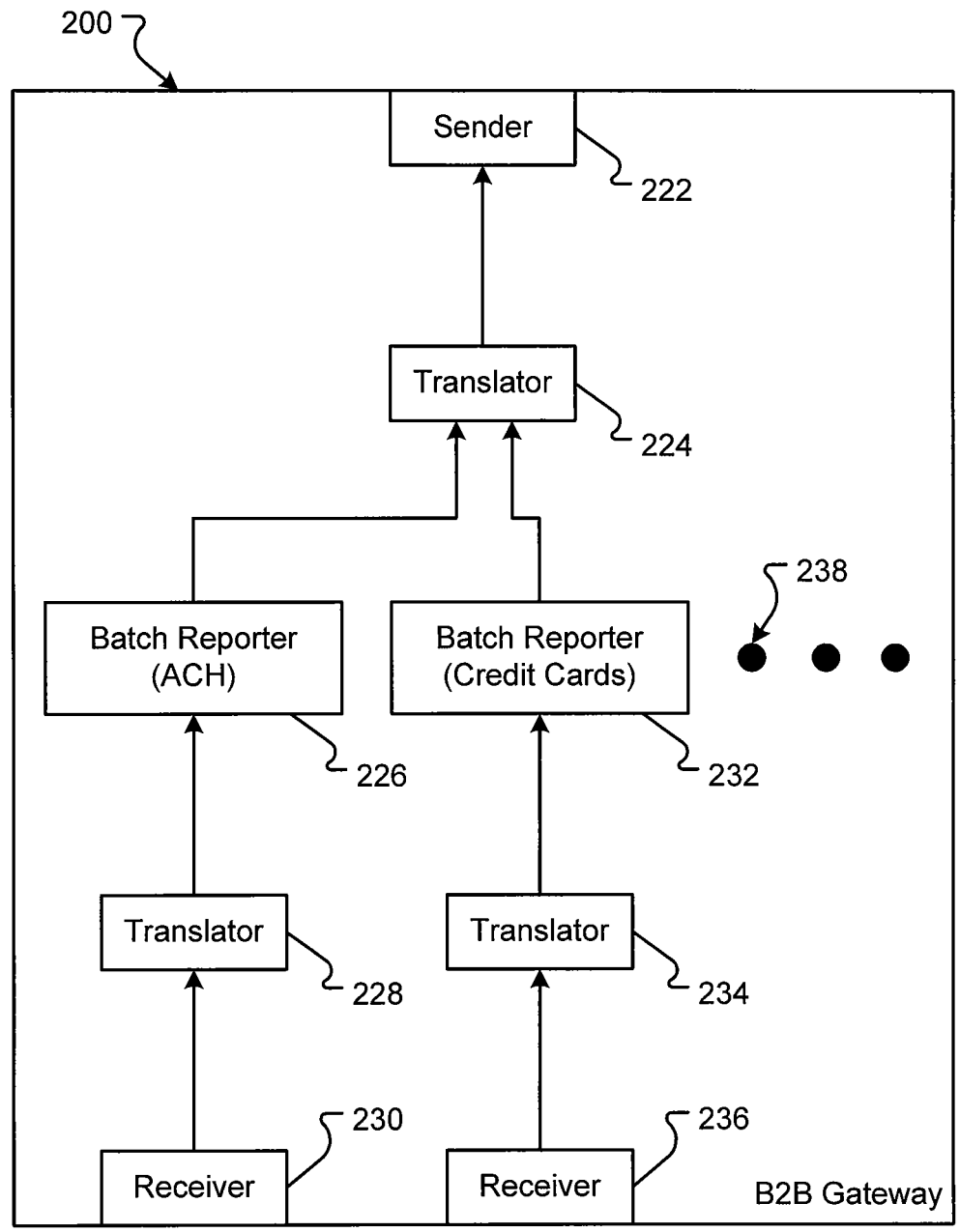

An embodiment of a B2B gateway 200, which may be the same or similar to the B2B gateway 108 in FIG. 1, is shown in FIGS. 2A and 2B. Embodiments of the B2B gateway 200 that receive and process payment instructions is shown in FIG. 2A, and embodiments of the B2B gateway 200 that receive and process authorizations or confirmations is shown in FIG. 2B. In embodiments, the B2B gateway 200 comprises hardware, software, or hardware and software to perform the functions described herein. The B2B gateway 200 can be a computing system as described in conjunction with FIG. 10. The one or more components described in conjunction with the B2B gateway 200 may be software components executable by a processor of a computing system and operable to perform the functions described herein. In embodiments, the B2B Gateway 200 includes an Application Integrator/Enterprise System with business rule logic that tracks and routes payment transactions to the appropriate payment platforms.

In embodiments, the B2B gateway 200 comprises a receiver 202, a first translator 204, a parser 206, one or more batch settlers 208 and/or 214, one or more second translators 210 and/or 216, and/or one or more senders 212 and/or 218. In embodiments, the B2B gateway 200 includes fewer or more components than those described herein. The receiver 202, in embodiments, receives one or more payment instructions. The receiver 202 can be a hardware component, for example, a router, transceiver, or other system for receiving instructions. In embodiments, the receiver 202 also includes software to receive the payment instructions. The receiver 202, in embodiments, receives instructions in one or more formats or standards. For example, the receiver 202 receives instructions from the EIPP application 104 (FIG. 1) in a first format and other instructions from the credit card association 106 (FIG. 1) in a second format. The payment instructions can be an mark-up language message, e.g., XML message, EDI, proprietary, ISO, UN/EDIFACT, etc.

A translator 204, in embodiments, translates the payment instructions from one or more native formats into a standard format. The translator 204 may be referred to as a payment instructions translator. For example, the payment instructions from an EIPP application 104 (FIG. 1) may have a first format. Further, one buyer accounts payable 102 (FIG. 1) may use a first format While a second buyer accounts payable 102 (FIG. 1) may use a second format, even if both buyer accounts payable 102 (FIG. 1) send payment instruction over the EIPP application 104 (FIG. 1). In embodiments, the translator 204 comprises two or more translation files. Each translation file can map one or more native formats to the standard format. The translator 204 can call the translation file for the payment instruction received and translate the payment instruction with the translation file.

A parser 206 can parse a payment instruction. In embodiments, one or more payment instructions are batch files. A batch file is a collection of two or more payment instructions; each payment instruction in the batch file can be a separate and discrete payment instruction. The parser 206, in embodiments, separates the several payment instructions into the discrete payment instructions. In embodiments, each payment instruction includes a standard format that can be identified by the standard formation. For example, the standard format may include a header that identifies a new instruction. Each instruction in the batch file can be for a different system according to information in the payment instruction. The parser 206, in embodiments, sends the separate instructions to the proper settler according to the system needed to complete the payment (e.g., the settlement account 110 (FIG. 1) or the credit card platform 116 (FIG. 1)).

In embodiments, the B2B gateway 200 includes two or more batch settlers 208 and/or 214. There may be more or fewer batch settlers than that shown in FIG. 2A, as represented by the ellipses 220. A first batch settler 208 can accept payment instructions for ACH payments. The batch settler 214 can accept payment instructions for credit card payments. In embodiments, a batch settler 208 and/or 214 receives two or more payment instructions. The two or more payment instructions are batched for one of the payment systems. For example, batch settler 214 receives several payment instructions for a single supplier 114 (FIG. 1) but from two or more buyers. The batch settler 214 batches all the payment instructions for a single supplier 114 (FIG. 1) and sends the batched payment instructions to the payment system. Therefore, the B2B gateway 200 can organize payment instructions from two or more buyers for one supplier 114 (FIG. 1) and increase efficiency.

The B2B gateway 200 can also include two or more translators 210 and/or 216. The translators 210 and/or 216 may be referred to as batch payment translators. In embodiments, the translators 210 and/or 216 translate the batch payment instructions received from one of the batch settlers 208 and/or 214 from the standard format into one or more native formats. The native formats are related to the format required by one or more payment systems (e.g., the settlement account 110 (FIG. 1) or the credit card platform 116 (FIG. 1)). In embodiments, the translators 210 and/or 216 comprise two or more translation files. Each translation file can map the standard format into one of the native formats. The translators 210 and/or 216 can call the translation file for the payment instruction received and translate the payment instruction with the translation file.

In embodiments, the B2B gateway 200 comprises a sender 212 and/or 218. The sender 212 and/or 218, in embodiments, sends one or more payment instructions over one of the payment system senders, for example, the settlement account 110 (FIG. 1) or the credit card platform 116 (FIG. 1). The sender 212 and/or 218 can be a hardware component, for example, a router, transceiver, or other system for sending instructions. In embodiments, the sender 212 and/or 218 and the receiver 202 may be the same hardware. In embodiments, the sender 212 and/or 218 also includes software to send the payment instructions. The sender 212 and/or 218, in embodiments, sends instructions in one or more native formats or standards. For example, sender 212 and/or 218 sends payment instruction for the settlement account 110 (FIG. 1) in a first format and other instructions for the credit card platform 116 (FIG. 1) in a second format. The payment instructions can be any mark-up language message, e.g., XML message, EDI, proprietary, ISO, UN/EDIFACT, etc.

Another embodiment of a B2B gateway 200, which may be the same or similar to the B2B gateway 108 in FIG. 1, is shown in FIG. 2B. In embodiments, the B2B gateway 200 comprises hardware, software, or hardware and software to perform the functions described herein. The B2B gateway 200 can be a computing system as described in conjunction with FIG. 10. The one or more components described in conjunction with the B2B gateway 200 may be software components executable by a processor of a computing system and operable to perform the functions described herein.

In embodiments, the B2B gateway 200 comprises two or more receivers 230 and/or 236, two or more first translators 228 and/or 234, two or more batch reporters 226 and/or 232, a second translator 224, and/or a sender 222. In embodiments, the B2B gateway 200 includes fewer or more components than those described herein. The receivers 230 and/or 236, in embodiments, receive one or more authorization and/or confirmation messages. An authorization message can be a message from one of the payment systems (e.g., the settlement account 110 (FIG. 1) or the credit card platform 116 (FIG. 1)) that states the payment associated with a payment message has been authorized for payment. The authorization message may be received before the payment actually occurs or before the payment is completed. A confirmation message can be a message associated with a payment message that acknowledges the payment has been completed. The receivers 230 and/or 236 can be hardware components, for example, a router, a transceiver, or other system for receiving messages. In embodiments, the receivers 230 and/or 236 also include software to receive the authorization and/or confirmation messages. The receivers 230 and/or 236, in embodiments, receive receivers 230 and/or 236 in one or more formats or standards. For example, the receivers 230 and/or 236 receive authorization and/or confirmation messages from the ACH system in a first format and other authorization and/or confirmation messages from the credit card platforms 116 (FIG. 1) in a second format. The authorization and/or confirmation messages can be XML messages. In other embodiments, if the authorization or confirmation messages are batched, the authorization or confirmation message may be in a different format. If the authorization or confirmation messages are received contemporaneously with the instructions, the authorization or confirmation messages may be in an ISO format or other proprietary format.

The translators 228 and/or 234, in embodiments, translates the authorization and/or confirmation messages from one or more native formats into a standard format. The translators 228 and/or 234 may be referred to as authorization and/or confirmation message translators. For example, the authorization and/or confirmation message from the ACH system may have a first format and a second format for credit card authorization and/or confirmation messages. Further, one supplier 114 (FIG. 1) may use a first format while a second supplier 114 (FIG. 1) may use a second format, even if both suppliers 114 (FIG. 1) send payment messages over the credit card platforms 116 (FIG. 1). In embodiments, the translators 228 and/or 234 comprise two or more translation files. Each translation file can map one or more native formats to the standard format. The translators 228 and/or 234 can call the translation file for the payment message received and translate the payment message with the translation file.

In embodiments, the B2B gateway 200 includes two or more batch reporters 226 and/or 232. There may be more or fewer batch settlers than that shown in FIG. 2B, as represented by the ellipses 238. A first batch reporter 226 can accept authorization and/or confirmation messages for ACH payments. The batch reporter 232 can accept authorization and/or confirmation messages for credit card platforms 116 (FIG. 1). In embodiments, batch reporters 226 and/or 232 receive two or more authorization and/or confirmation messages. The two or more authorization and/or confirmation messages are batched for one of the buyer accounts payable 102 (FIG. 1). For example, batch reporter 226 receives several payment messages for a single buyer accounts payable 102 (FIG. 1) but from two or more suppliers 114 (FIG. 1). The batch reporter 226 batches all of the authorization and/or confirmation messages for a single buyer accounts payable 102 (FIG. 1) and sends the batched authorization and/or confirmation messages to the buyer accounts payable 102 (FIG. 1). Therefore, the B2B gateway 200 can organize authorization and/or confirmation messages from two or more suppliers 114 (FIG. 1) for one buyer accounts payable 102 (FIG. 1) and increase efficiency.

The B2B gateway 200 can also include a second translator 224. The translator 224 may be referred to as a batch authorization and/or confirmation message translator. In embodiments, the translator 224 translates the batch authorization and/or confirmation messages received from one of the batch reporters 226 and/or 232 from the standard format into one or more native formats. The native formats are related to the format required by one or more buyer accounts payable 102 (FIG. 1). In embodiments, the translator 224 comprises two or more translation files. Each translation file can map the standard format into one of the native formats. The translator 224 can call the translation file for the payment received and translate the payment with the translation file.

In embodiments, the B2B gateway 200 comprises a sender 222. The sender 222, in embodiments, sends one or more batches of authorization and/or confirmation messages to one or more buyer accounts payable 102 (FIG. 1). The sender 222 can be a hardware component, for example, a router, transceiver, or other system for sending messages. In embodiments, the sender 222 and the receivers 230 and/or 236 may be the same hardware. In embodiments, the sender 222 also includes software to send the batches of authorization and/or confirmation messages. The sender 222, in embodiments, sends messages in one or more native formats or standards. For example, sender 222 sends authorization and/or confirmation messages for the buyer accounts payable 102a (FIG. 1) in a first format and other messages from the buyer accounts payable 102b (FIG. 1) in a second format. The authorization and/or confirmation messages can be XML messages.

Figure 3A:
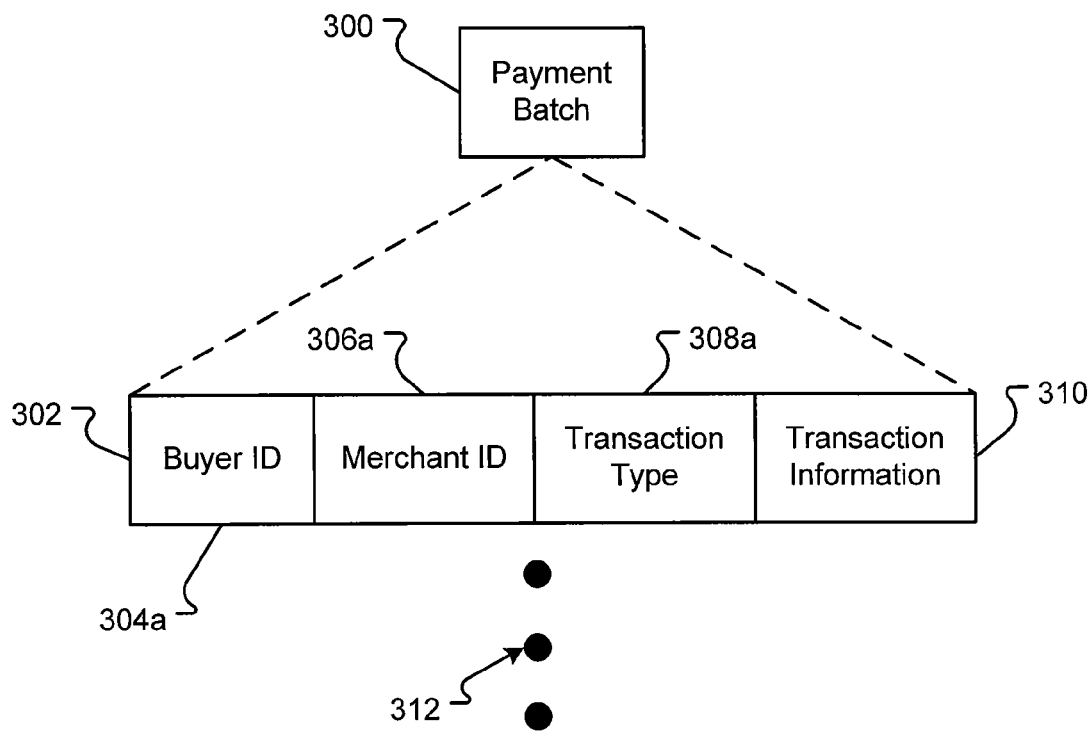
FIGS. 3A and 3B are block diagrams of embodiments of data structures representing a payment message and an authorization/confirmation message, respectively.

An embodiment of a payment message batch instruction 300 (also referred to as a payment batch) including one or more payment instructions 302 is shown in FIG. 3A. Each payment batch 300 can include more or fewer instructions than that shown in FIG. 3A as represented by the ellipses 312. The information in the payment instruction batch 300 may be stored by the B2B gateway 108 (FIG. 1) in a storage medium for later retrieval. The payment batch 300, as shown in FIG. 3A, can be in a native format or the standard format. If the payment batch 300 is in the native format, the payment batch 300 can be translated into the standard format by changing the order of information, changing the size of the instruction, changing the content from one form to another form, etc. In embodiments, the payment instruction 302 includes a buyer identifier (BID) 304a, a merchant identifier (MID) 306, a transaction type 308 message, and transaction information 310.

In embodiments, the BID 304 is an alphanumeric identifier that identifies the buyer accounts payable 102 (FIG. 1) from which the payment instruction originated. In other embodiments, the BID 304 also includes an identifier for the system (EIPP application 104 (FIG. 1) or credit card association 106 (FIG. 1)) from which the payment instruction was received. If the payment batch 300 was received from a single buyer accounts payable 102 (FIG. 1), then all the BIDs 304, in embodiments, are the same.

The merchant identifier 306 can also be an alphanumeric identifier that identifies the supplier 114 (FIG. 1) to which the payment instruction is directed. In embodiments, the MID 306 can also include information about the payment system (e.g., the settlement account 110 (FIG. 1) or the credit card platform 116 (FIG. 1)) that is to be used for the payment. In alternative embodiments, each MID 306 is associated to a payment system by the B2B gateway 108 (FIG. 1). The B2B gateway 108 (FIG. 1) can store the associations in a storage medium for later retrieval.

The payment instruction 302 can optionally include transaction type information 308. Transaction type information 308 can include the type of payment to be made, for example, credit card payment, bank transfer, etc. In other embodiments, the transaction type information 308 also includes the payment system to be used (e.g., the settlement account 110 (FIG. 1) or the credit card platform 116 (FIG. 1)). The B2B gateway 108 (FIG. 1) may also associate the information in the transaction type information 308 with the MID 306 and store the association in a storage medium for later retrieval. Therefore, the transaction type information 308 is not needed in the payment instruction 302.

In embodiments, the payment instruction 302 includes transaction information 310. Transaction information 310 can include the information required to complete the payment. In embodiments, the transaction information 310 includes one or more of, but is not limited to, the product or service purchased, the date of the purchase, the amount of the purchase, the payment system to be used, the date upon which a payment needs to be made, etc. The payment systems can use the transaction information 310 to affect the payment.

Figure 3B:
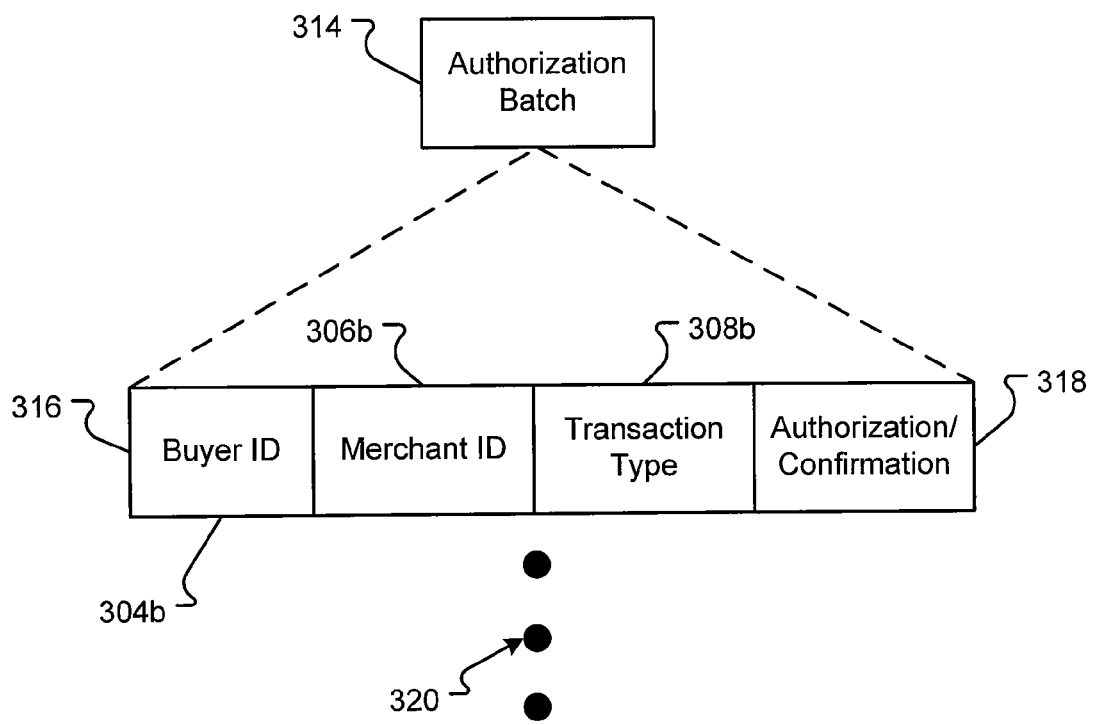

An embodiment of an authorization and/or confirmation message batch message 314 (also referred to as an authorization batch) including one or more authorization and/or confirmation messages 316 is shown in FIG. 3B. Each authorization batch 314 can include more or fewer messages than that shown in FIG. 3B as represented by the ellipses 320. The information in the authorization batch 314 may be stored by the B2B gateway 108 (FIG. 1) in a storage medium for later retrieval. The authorization batch 314, as shown in FIG. 3B, can also be in a native format or the standard format. If the authorization batch 314 is in the native format, the authorization batch 314 can be translated into the standard format by changing the order of information, changing the size of the message, changing the content from one form to another form, etc. In embodiments, the authorization and/or confirmation messages 316 includes a buyer identifier (BID) 304b, a merchant identifier (MID) 306b, a transaction type 308b message, and authorization/confirmation information 318. In embodiments, the BID 304b, the MID 306b, and/or the transaction type information 308b is the same as the BID 304a, the MID 306a, and/or the transaction type information 308a described in conjunction with FIG. 3A. As such, the BID 304b, the MID 306b, and/or the transaction type information 308b will not be explained further.

In embodiments, the authorization and/or confirmation messages 316 includes authorization/confirmation information 318. Authorization/confirmation information 318 can include the information required to acknowledge the authorization of a payment or the confirmation that the payment has been made. In embodiments, the authorization/confirmation information 318 includes one or more of, but is not limited to, the date of the authorization or confirmation, the date the payment will be made, the amount of the payment, the payment system used, etc. The buyer accounts payable 102 (FIG. 1) can use the authorization/confirmation information 318 to determine if a payment is completed.

Figure 4:
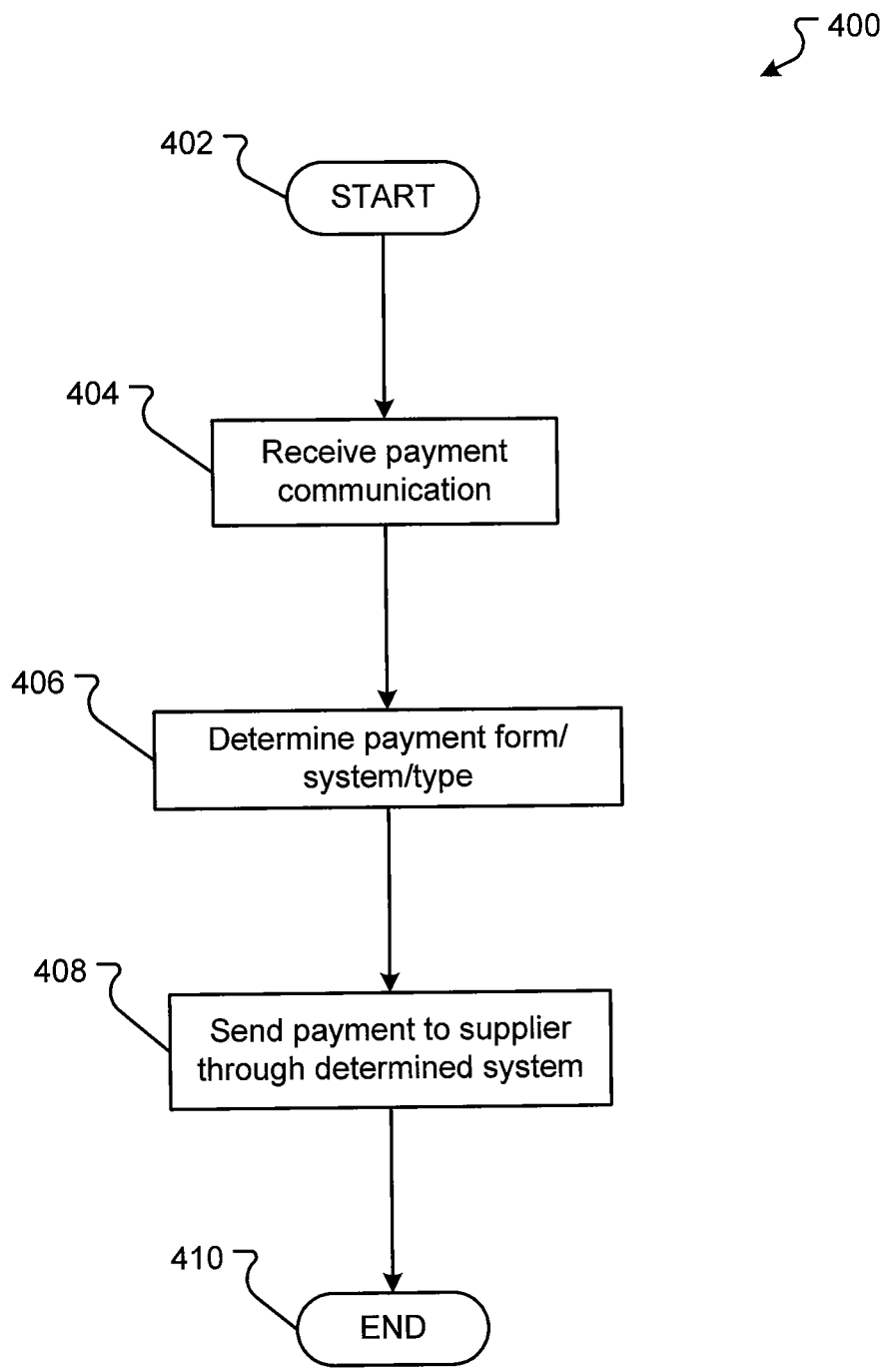
FIG. 4 is a flow diagram of an embodiment of a method for transferring a payment message with a B2B gateway.

An embodiment of a method 400 for sending a payment instruction over a payment system 100 (FIG. 1) is shown in FIG. 4. In embodiments, the method 400 generally begins with a START operation 402 and terminates with an END operation 410. The steps shown in the method 400 may be executed in a computer system as a set of computer executable instructions. While a logical order is shown in FIG. 4, the steps shown or described can, in some circumstances, be executed in a different order than presented herein.

Receive operation 404 receives a payment instruction. In embodiments, a B2B gateway 108 (FIG. 1) receives a payment instruction from one or more buyer accounts payable 102 (FIG. 1). The payment instruction may be a payment batch 300 (FIG. 3A) including two or more payment instructions for two or more suppliers 114 (FIG. 1). In embodiments, the receiver 202 (FIG. 2A) receives the instruction from an EIPP application 104 (FIG. 1) or a credit card association 106 (FIG. 1). In other embodiments, the receiver 202 (FIG. 2A) receives the instruction from another system. The received instruction may be in a standard or native format. In embodiments, the payment instruction is an XML file having a native format dictated by the software of the buyer accounts payable 102 (FIG. 1). An embodiment of the receive operation 404 is described in conjunction with FIG. 5.

Determine operation 406 determines the payment form/system/type. The form of the payment may be whether the payment is a bank transfer, credit card payment, etc. The type of the payment may be whether the payment is a debit, credit, etc. The system can be the payment system that is to be used, for example, the ACH system, a check, or the credit card platform 116 (FIG. 1). In embodiments, the B2B gateway 108 (FIG. 1) determines to which payment system (the ACH system or the credit card platform 116 (FIG. 1)) the payment instruction is directed. The B2B gateway 108 (FIG. 1) may read transaction type information 308 (FIG. 3A) to determine the payment system to be used. In further embodiments, the B2B gateway 108 (FIG. 1) can read the transaction information 310 (FIG. 3A) to determine the system/type/form of the payment. The batch settler 208 and/or 214 (FIG. 2A) can read the MID 306 (FIG. 3A). The batch settler 208 and/or 214 (FIG. 2A) may then access a database in storage medium that associates the MID 306 (FIG. 3A) with a payment system. The batch settler 208 and/or 214 (FIG. 2A), in embodiments, determines the payment system according to the stored association. An embodiment of the determine operation 406 is described in conjunction with FIG. 6.

Send operation 408 sends the payment to a supplier 114 (FIG. 1) through the determined system. In embodiments, the B2B gateway 108 (FIG. 1) sends the payment to the settlement account 110 (FIG. 1) or one of the credit card platforms 116 (FIG. 1) to affect the payment. In other embodiments, the B2B gateway 108 (FIG. 1) has a check created and mailed to the supplier 114 (FIG. 1). The sender 212 and/or 218 (FIG. 2B) can send the payment instruction to the payment system. In embodiments, the sender 212 and/or 218 (FIG. 2B) sends the payment to the payment system according to the direction from the determine operation as to the correct payment system and supplier 114 (FIG. 1).

Figure 5:
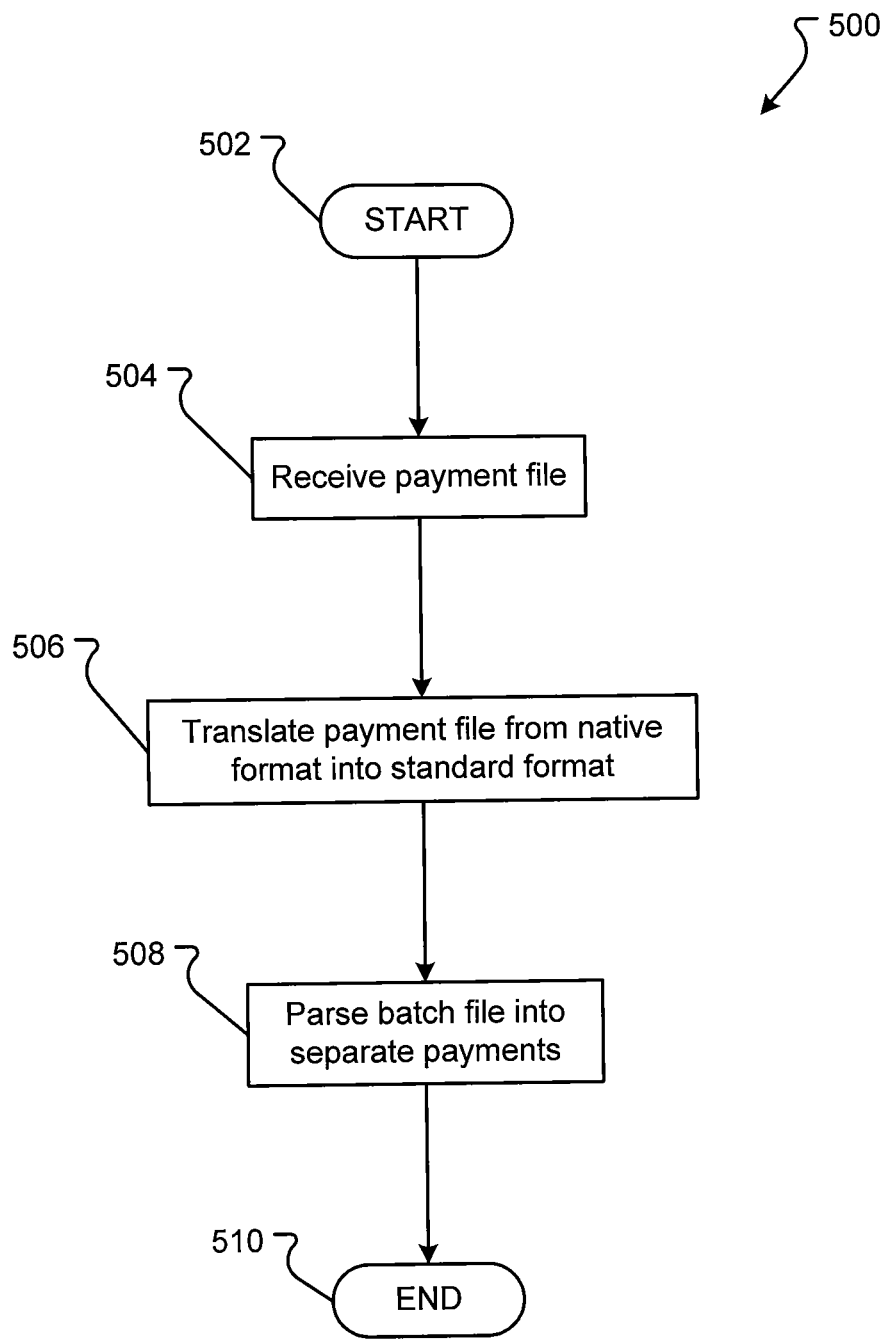
FIG. 5 is a flow diagram of an embodiment of a method for receiving a payment message with a B2B gateway.

An embodiment of a method 500 representing the receive operation 404 (FIG. 4) is shown in FIG. 5. In embodiments, the method 500 generally begins with a START operation 502 and terminates with an END operation 510. The steps shown in the method 500 may be executed in a computer system as a set of computer executable instructions. While a logical order is shown in FIG. 5, the steps shown or described can, in some circumstances, be executed in a different order than presented herein.

Receive operation 504 receives a payment instruction. In embodiments, a B2B gateway 108 (FIG. 1) receives a payment batch 300 (FIG. 3A) from one or more buyer accounts payable 102 (FIG. 1). In embodiments, the receiver 202 (FIG. 2A) receives the payment batch 300 (FIG. 3A) from an EIPP application 104 (FIG. 1) or a credit card association 104 (FIG. 1). In other embodiments, the receiver 202 (FIG. 2A) receives the payment batch 300 (FIG. 3) from another system. In embodiments, the payment batch 300 (FIG. 3A) is an XML file having a native format dictated by the software of the buyer accounts payable 102 (FIG. 1).

Translate operation 506 translates the payment instruction from a native format into a standard format. The B2B gateway 108 (FIG. 1) can translate the payment batch 300 (FIG. 3A) into a standard format by changing the payment batch 300 (FIG. 3A) according to a translation file. In embodiments, a translator 204 (FIG. 2A) retrieves a translation file that maps the payment batch 300 (FIG. 3A) from the native format to the standard format. The translator 204 (FIG. 2A) then manipulates the information in the payment batch 300 (FIG. 3A) to create a payment batch 300 (FIG. 3A) in a standard format.

Parse operation 508 parses the payment batch 300 (FIG. 3A) into one or more separate payment instructions 302 (FIG. 3A). In embodiments, the parser 206 (FIG. 2A) receives the payment batch 300 (FIG. 3A) and parses the payment batch 300 (FIG. 3A) into two or more payment instructions 302 (FIG. 3A). The parser 206 (FIG. 2A) may separate the payment instructions 302 (FIG. 3A) by locating BIDs 304 (FIG. 3) within the payment instructions 302 (FIG. 3A). In other embodiments, the parser 206 (FIG. 2A) may locate separate payment instructions 302 (FIG. 3A) by determining headers for the payment instructions 302 (FIG. 3A). The parser 206 (FIG. 2A) can copy the information for each of the payment instructions 302 (FIG. 3A) and store the information or send the information to a batch settler 208 and/or 214 (FIG. 2A).

Figure 6:
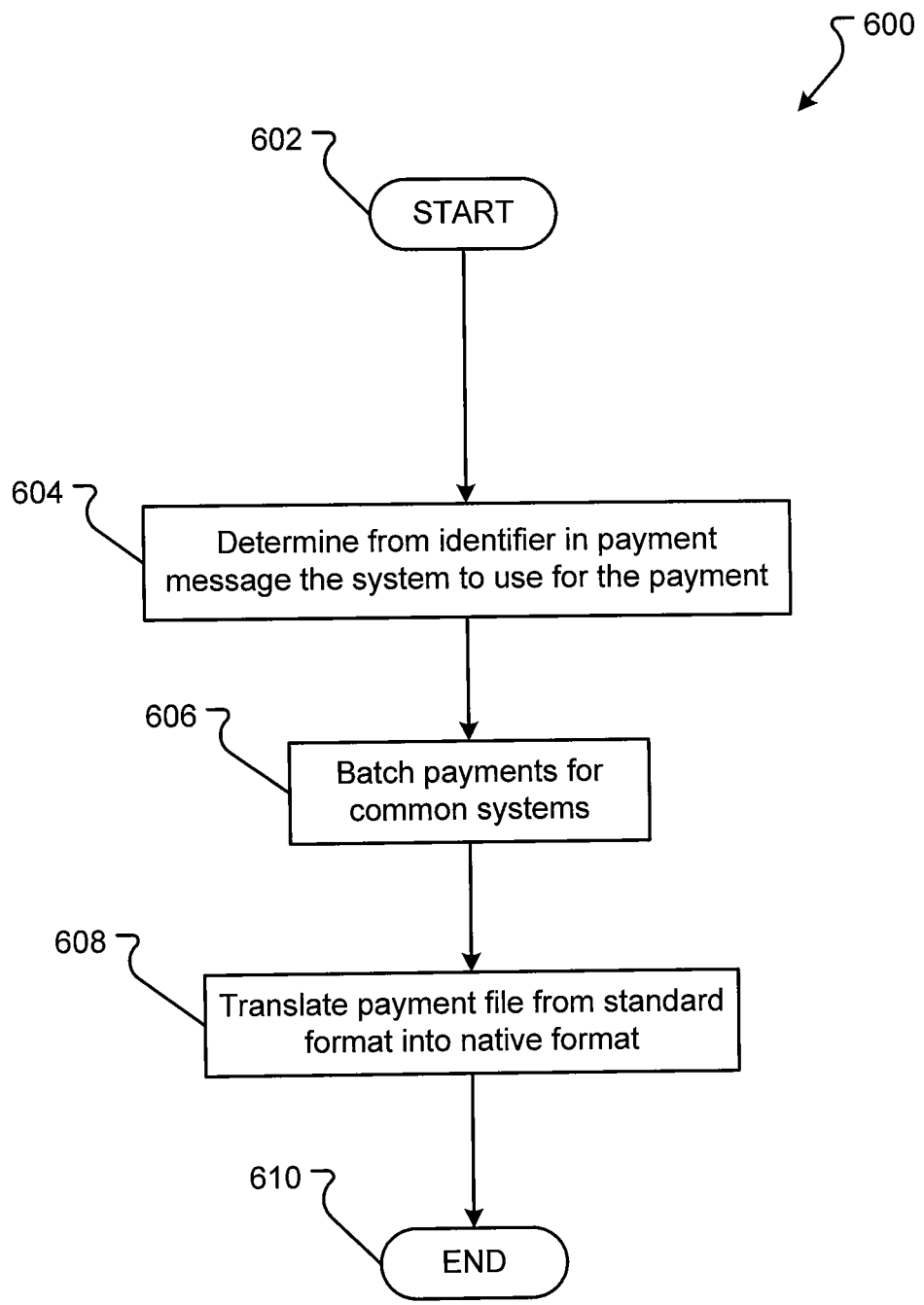
FIG. 6 is a flow diagram of an embodiment of a method for determining which payment systems to use to send a payment message with a B2B gateway.

An embodiment of a method 600 representing the determine operation 406 (FIG. 4) is shown in FIG. 6. In embodiments, the method 600 generally begins with a START operation 602 and terminates with an END operation 610. The steps shown in the method 600 may be executed in a computer system as a set of computer executable instructions. While a logical order is shown in FIG. 6, the steps shown or described can, in some circumstances, be executed in a different order than presented herein.

Determine operation 604 determines from an identifier which payment system a payment should use. In embodiments, the batch settlers 208 and/or 214 (FIG. 2A) receive the payment instructions from the parser 206 (FIG. 2A). Each of the batch settlers 208 and/or 214 (FIG. 2A), in embodiments, are associated with only one type of payment, e.g., credit card payments, ACH payments, check payments etc. The parser 206 (FIG. 2A) may determine which batch settler 208 (FIG. 2A) or 214 (FIG. 2A) will receive a payment instruction 302 (FIG. 3) depending on data in the payment instructions 302 (FIG. 3A). For example, the parser 206 (FIG. 2A) may retrieve association data from a storage medium. The association data may associate one or more MIDs 306 (FIG. 3) with one or more payment system 112 and/or 116 (FIG. 1). For example, all payments directed to a first MID 306*a* (FIG. 3A) are sent to a credit card platform 116 (FIG. 1). In other embodiments, the parser 206 (FIG. 2A) determines the batch settler 208 (FIG. 2) or 214 (FIG. 2) using information in the transaction type information 308*a* (FIG. 3A) or in the transaction information 310 (FIG. 3A). In other embodiments, all payment instructions 302 (FIG. 3A) are sent to each batch settler 208 (FIG. 2A) or 214 (FIG. 2A) and the batch settler 208 (FIG. 2A) or 214 (FIG. 2A) only operates on the associated payment instructions 302 (FIG. 3A).

Batch operation 606 batches payments for common payment systems. In embodiments, the batch settlers 208 and/or 214 (FIG. 2) receive payment messages 302 (FIG. 3A) from one or more buyers 102 (FIG. 1). While the payments may be from separate buyers, each payment may be directed to the same supplier 114 (FIG. 1). As such, the batch settlers 208 and/or 214 (FIG. 2A) batch the parsed payment instructions 302 (FIG. 3A) from the parser 206 (FIG. 2A) into a new batch. In embodiments, the batch settlers 208 and/or 214 (FIG. 2A) batch the payment instructions 302 (FIG. 3A) according to the MID 306*a* (FIG. 3A) in the payment instruction 302 (FIG. 3A).

Translate operation 608 translates the batched payment instruction file from the standard format into a native format. The B2B gateway 108 (FIG. 1) can translate the batched payment instruction file into a native format by changing the payment instruction file according to another translation file. In embodiments, a translator 228 and/or 234 (FIG. 2B) retrieves a translation file that maps the payment instruction file from the standard format to the native format. The translator 228 and/or 234 (FIG. 2B) then manipulates the information in the payment instruction file to create a payment instruction file in a native format.

Figure 7:
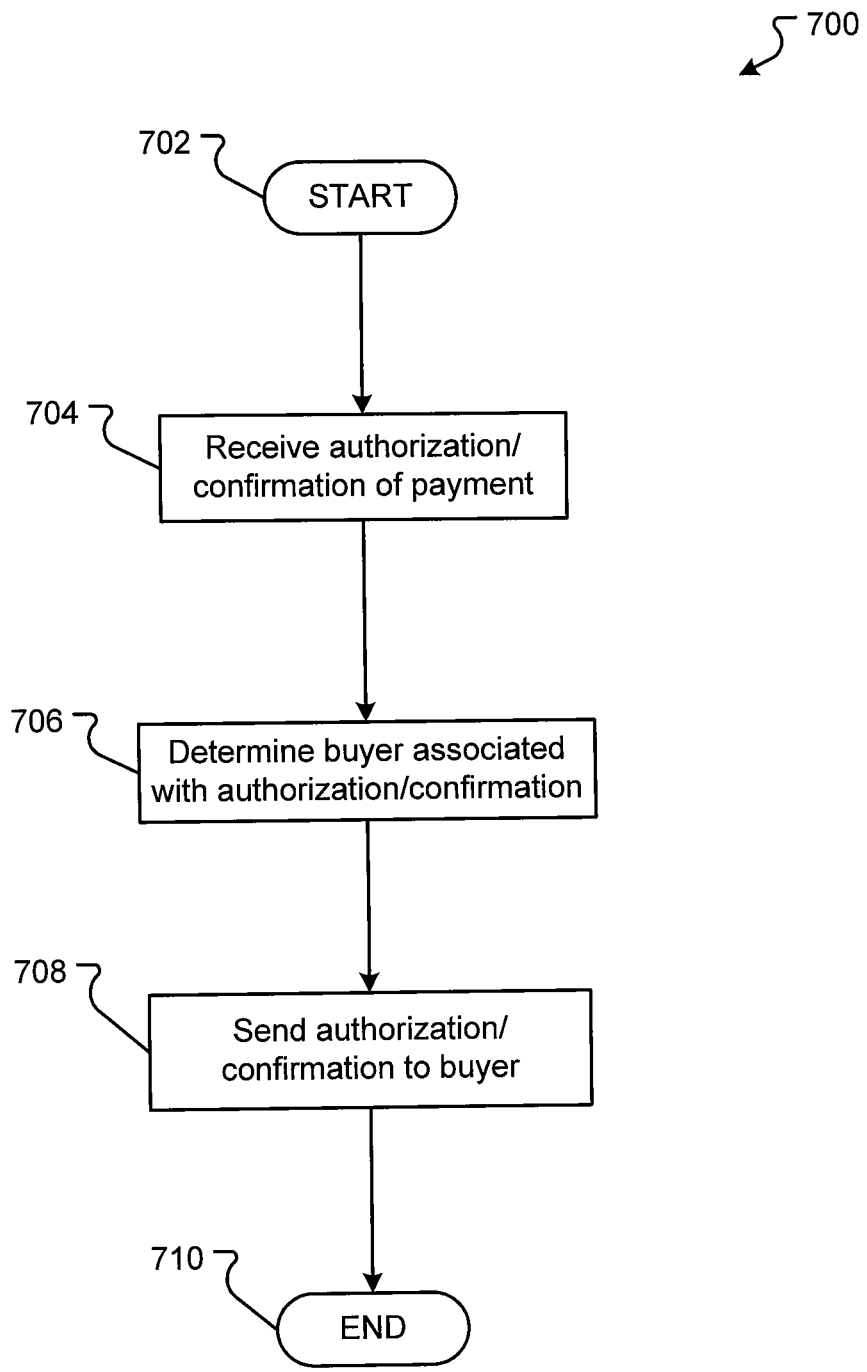
FIG. 7 is a flow diagram of an embodiment of a method for transferring an authorization/confirmation message with a B2B gateway.

An embodiment of a method 700 for sending an authorization/confirmation message to a buyer is shown in FIG. 7. In embodiments, the method 700 generally begins with a START operation 702 and terminates with an END operation 710. The steps shown in the method 700 may be executed in a computer system as a set of computer executable instructions. While a logical order is shown in FIG. 7, the steps shown or described can, in some circumstances, be executed in a different order than presented herein.

Receive operation 704 receives an authorization or confirmation message. In embodiments, a B2B gateway 108 (FIG. 1) receives the authorization or confirmation message from seller 114 (FIG. 1). The authorization or confirmation message may be associated with a buyer or a payment message already processed by the B2B gateway 108 (FIG. 1). In embodiments, a receiver 230 and/or 236 (FIG. 2B) receives the authorization or confirmation message from a credit card platform 116 (FIG. 1) or from a partner bank 112 (FIG. 1). In other embodiments, the receiver 230 and/or 236 (FIG. 2B) receives the message from another system. The received authorization or confirmation message may be in a standard or native format. In embodiments, the payment message is an XML file having a native format dictated by the software of the seller 114 (FIG. 1). In embodiments, the authorization or confirmation message is translated by a translator 228 and/or 234 (FIG. 2B) from the native format to a standard format. An embodiment of the receive operation 704 is described in conjunction with FIG. 8.

Determine operation 706 determines the buyer associated with the authorization or confirmation message. In embodiments, the B2B gateway 108 (FIG. 1) determines to which buyer accounts payable 102 (FIG. 1) the authorization or confirmation message is directed. The B2B gateway 108 (FIG. 1) may read BID 304*b* (FIG. 3B) in the authorization or confirmation message 316 to determine the buyer accounts payable 102 (FIG. 1) associated with the authorization or confirmation message 316. In further embodiments, the B2B gateway 108 (FIG. 1) can read the authorization/confirmation information 318 (FIG. 3B) to determine the buyer accounts payable 102 (FIG. 1). In still other embodiments, the transaction information 318 (FIG. 3B) can be retrieved and compared to previously stored data at the B2B gateway 108 (FIG. 1) to find the buyer accounts payable 102 (FIG. 1). A batch reporter 226 and/or 232 (FIG. 2B) can read the BID 304*b*. The batch reporter 226 and/or 232 (FIG. 2B) may then access a database in a storage medium that associates the BID 304 (FIG. 3) with a buyer 102 (FIG. 1). The batch reporter 226 and/or 232 (FIG. 2B), in embodiments, determines the buyer accounts payable 102 (FIG. 1) according to the stored association. An embodiment of the determine operation 706 is described in conjunction with FIG. 9.

Send operation 708 sends the authorization or confirmation message to a buyer accounts payable 102 (FIG. 1) through the determined system. In embodiments, the B2B gateway 108 (FIG. 1) sends the authorization or confirmation message 316 to the EIPP application 104 (FIG. 1) or the credit card association 106 (FIG. 1) to communicate the authorization or confirmation message 316. In other embodiments, the B2B gateway 108 (FIG. 1) sends a communication through another system, for example, a text message, an email, a letter, etc. The sender 222 (FIG. 2B) can send the authorization or confirmation message 316 to the buyer accounts payable 102 (FIG. 1). In embodiments, the sender 222 (FIG. 2B) sends the authorization or confirmation message 316 to the buyer accounts payable 102 (FIG. 1) according to a directive from the determine operation 706 as to the correct system (e.g., EIPP application 104 (FIG. 1) or the credit card association 106 (FIG. 1)) and buyer accounts payable 102 (FIG. 1).

Figure 8:
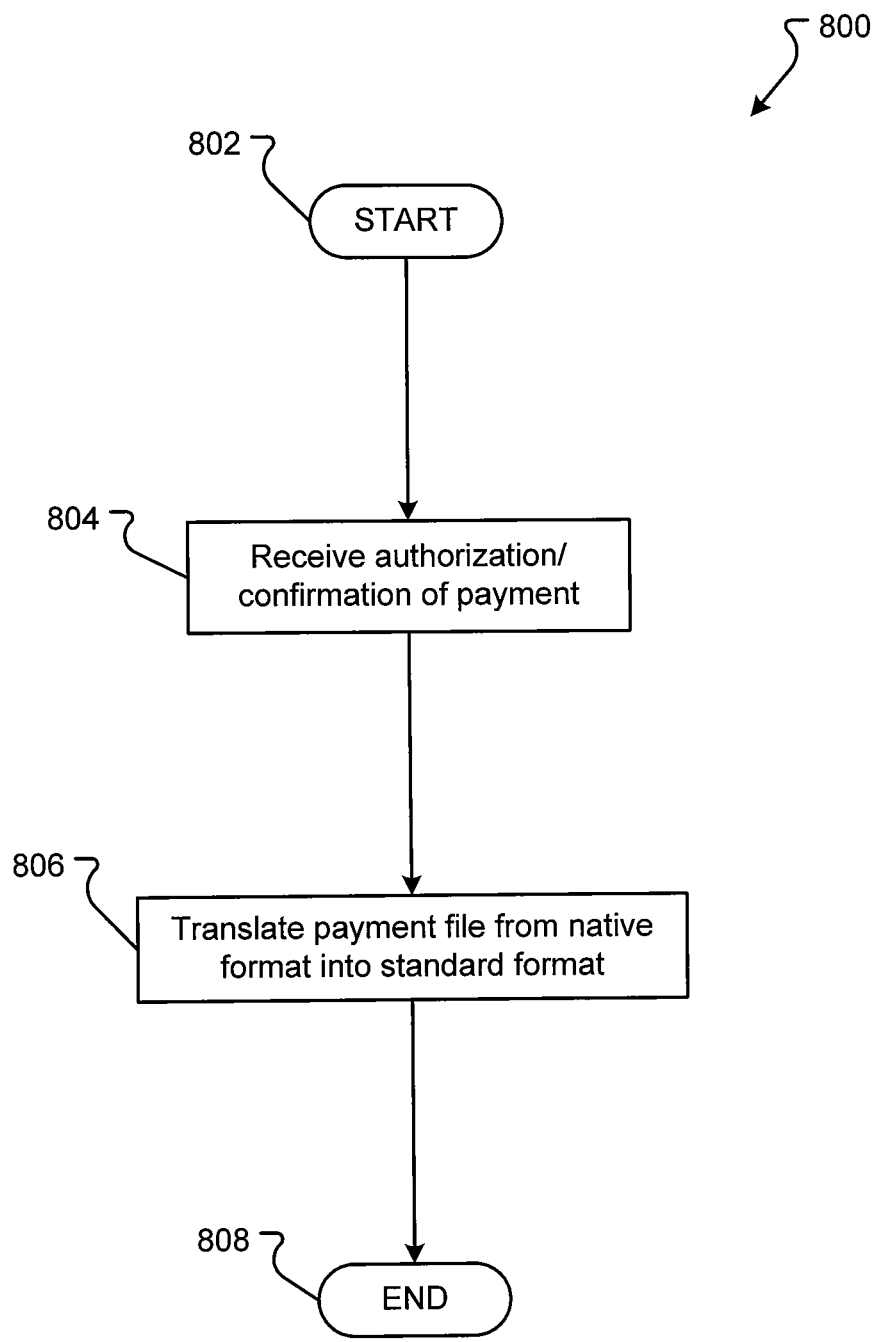
FIG. 8 is a flow diagram of an embodiment of a method for receiving an authorization/confirmation message with a B2B gateway.

An embodiment of a method 800 representing the receive operation 704 (FIG. 7) is shown in FIG. 8. In embodiments, the method 800 generally begins with a START operation 802 and terminates with an END operation 808. The steps shown in the method 800 may be executed in a computer system as a set of computer executable instructions. While a logical order is shown in FIG. 8, the steps shown or described can, in some circumstances, be executed in a different order than presented herein.

Receive operation 804 receives an authorization or confirmation message. In embodiments, a B2B gateway 108 (FIG. 1) receives an authorization or confirmation message 316 (FIG. 3B) from a seller 114 (FIG. 1). In embodiments, a receiver 230 and/or 236 (FIG. 2B) receives the authorization or confirmation message 316 (FIG. 3B) from settlement bank 112 (FIG. 1) or a credit card platform 116 (FIG. 1). In other embodiments, the receiver 230 and/or 236 (FIG. 2B) receives the authorization or confirmation message 316 (FIG. 3B) from another system. In embodiments, the authorization or confirmation message 316 (FIG. 3B) is an XML file having a native format dictated by the software of the seller 114 (FIG. 1).

Translate operation 806 translates the authorization or confirmation message 316 (FIG. 3B) from a native format into a standard format. The B2B gateway 108 (FIG. 1) can translate the authorization or confirmation message 316 (FIG. 3B) into a standard format by changing the authorization or confirmation message 316 (FIG. 3B) according to a translation file. In embodiments, a translator 228 and/or 234 (FIG. 2B) retrieves a translation file that maps the authorization or confirmation message 316 (FIG. 3) from the native format to the standard format. The translator 228 and/or 234 (FIG. 2B) then manipulates the information in the authorization or confirmation message 316 (FIG. 3B) to create a authorization or confirmation message 316 (FIG. 3B) in a standard format.

Figure 9:
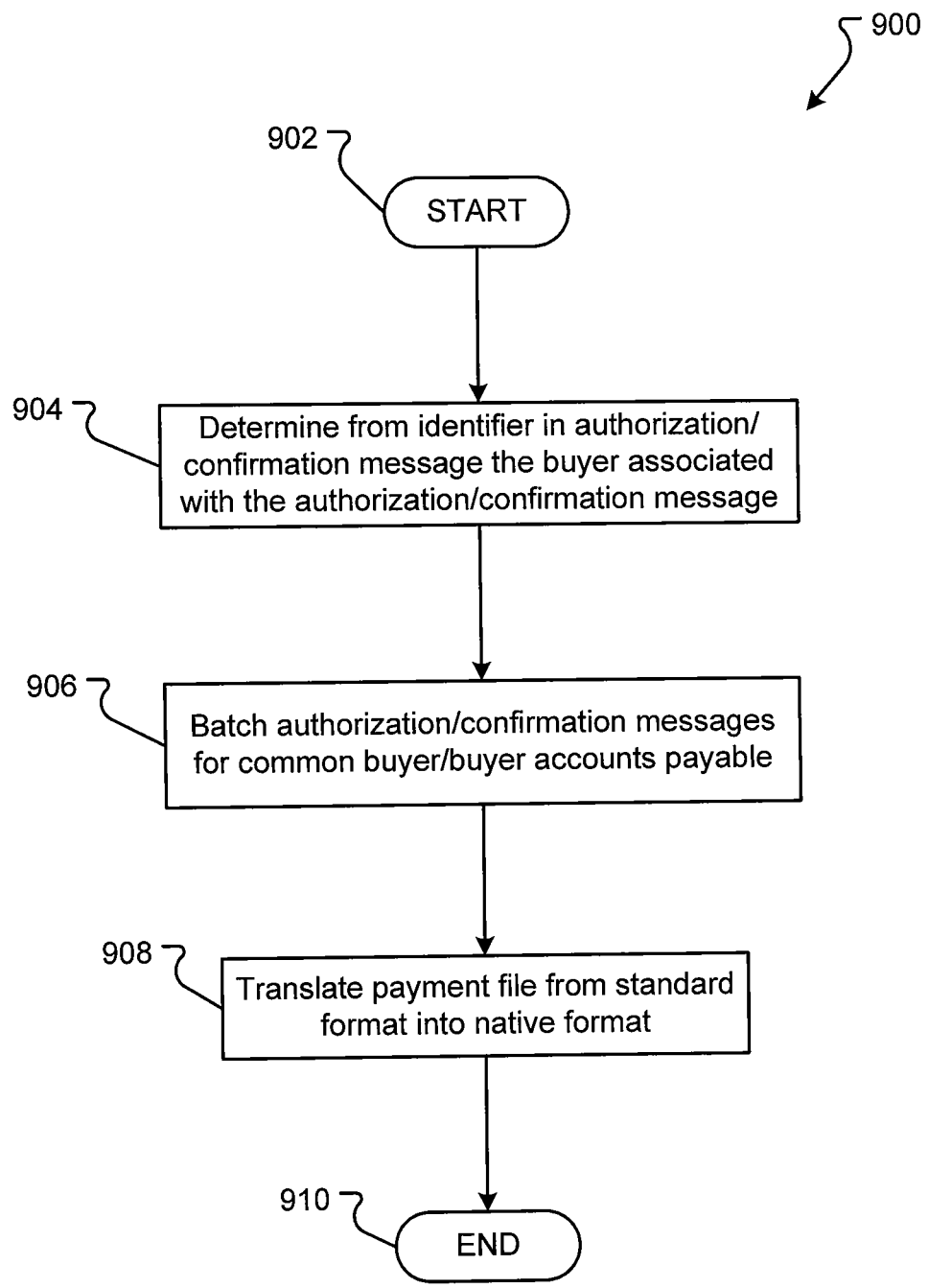
FIG. 9 is a flow diagram of an embodiment of a method for determining a buyer associated with an authorization/confirmation message with a B2B gateway.

An embodiment of a method 900 representing the determine operation 706 (FIG. 7) is shown in FIG. 9. In embodiments, the method 900 generally begins with a START operation 902 and terminates with an END operation 910. The steps shown in the method 900 may be executed in a computer system as a set of computer executable instructions. While a logical order is shown in FIG. 9, the steps shown or described can, in some circumstances, be executed in a different order than presented herein.

Determine operation 904 determines from an identifier to which buyer accounts payable 102 (FIG. 1) an authorization or confirmation message 316 (FIG. 3B) is associated. In embodiments, the batch reporter 226 and/or 232 (FIG. 2B) receives the authorization or confirmation message 316 (FIG. 3B) from the translator 228 and/or 234 (FIG. 2B). Each of the batch reporters 226 and/or 232 (FIG. 2B), in embodiments, are associated with only one type of payment system, e.g., credit card payments, ACH payments, check payments, etc. The translator 228 and/or 234 (FIG. 2B) may determine which batch reporter 226 and/or 232 (FIG. 2B) will receive an authorization or confirmation message 316 (FIG. 3B) depending on data in the authorization or confirmation message 316 (FIG. 3B). For example, the translator 228 and/or 234 (FIG. 2B) may retrieve association data from a storage medium. The association data may associate one or more BIDs 304b (FIG. 3B) with one or more buyer accounts payable 102 (FIG. 1). For example, all authorization or confirmation messages 316 (FIG. 3B) directed to a first BID 304 (FIG. 3) are sent to a first buyer accounts payable 102 (FIG. 1) over a credit card association 106 (FIG. 1). In other embodiments, the translator 228 and/or 234 (FIG. 2B) determines the batch reporter 226 and/or 232 (FIG. 2B) using information in the transaction type information 308a (FIG. 3A) or in the transaction information 310 (FIG. 3A). In other embodiments, all authorization or confirmation message 316 (FIG. 3B) are sent to each batch reporter 226 and/or 232 (FIG. 2B) and the batch reporter 226 and/or 232 (FIG. 2B) only operates on the authorization or confirmation messages 316 (FIG. 3B) associated with that particular batch reporter 226 and/or 232 (FIG. 2B).

Batch operation 906 batches authorization or confirmation messages 316 (FIG. 3B) for common buyer accounts payable 102 (FIG. 1). In embodiments, the batch reporter 226 and/or 232 (FIG. 2B) receives authorization or confirmation message 316 (FIG. 3B) from one or more sellers 114 (FIG. 1). While the authorization or confirmation message 316 (FIG. 3B) may be from separate sellers 114 (FIG. 1), each authorization or confirmation message 316 (FIG. 3B) may be directed to the same buyer accounts payable 102 (FIG. 1). As such, the batch reporters 226 and/or 232 (FIG. 2B) batch the separate authorization or confirmation messages 316 (FIG. 3B) from the translators 228 and/or 234 (FIG. 2B) into a batch. In embodiments, the batch reporter 226 and/or 232 (FIG. 2B) batches the authorization or confirmation messages 316 (FIG. 3B) according to the BID 306 (FIG. 3) in the authorization or confirmation messages 316 (FIG. 3B).

Translate operation 908 translates the batched authorization or confirmation messages 316 (FIG. 3B) from the standard format into a native format. The B2B gateway 108 (FIG. 1) can translate the batched authorization or confirmation messages 316 (FIG. 3B) into a native format by changing the authorization or confirmation message 316 (FIG. 3B) according to another translation file. In embodiments, a translator 224 (FIG. 2B) retrieves a translation file that maps the authorization or confirmation message batch 314 (FIG. 3B) from the standard format to the native format. The translator 224 (FIG. 2B) then manipulates the information in the authorization or confirmation message batch (FIG. 3B) to create an authorization or confirmation message batch in a native format.

Figure 10:
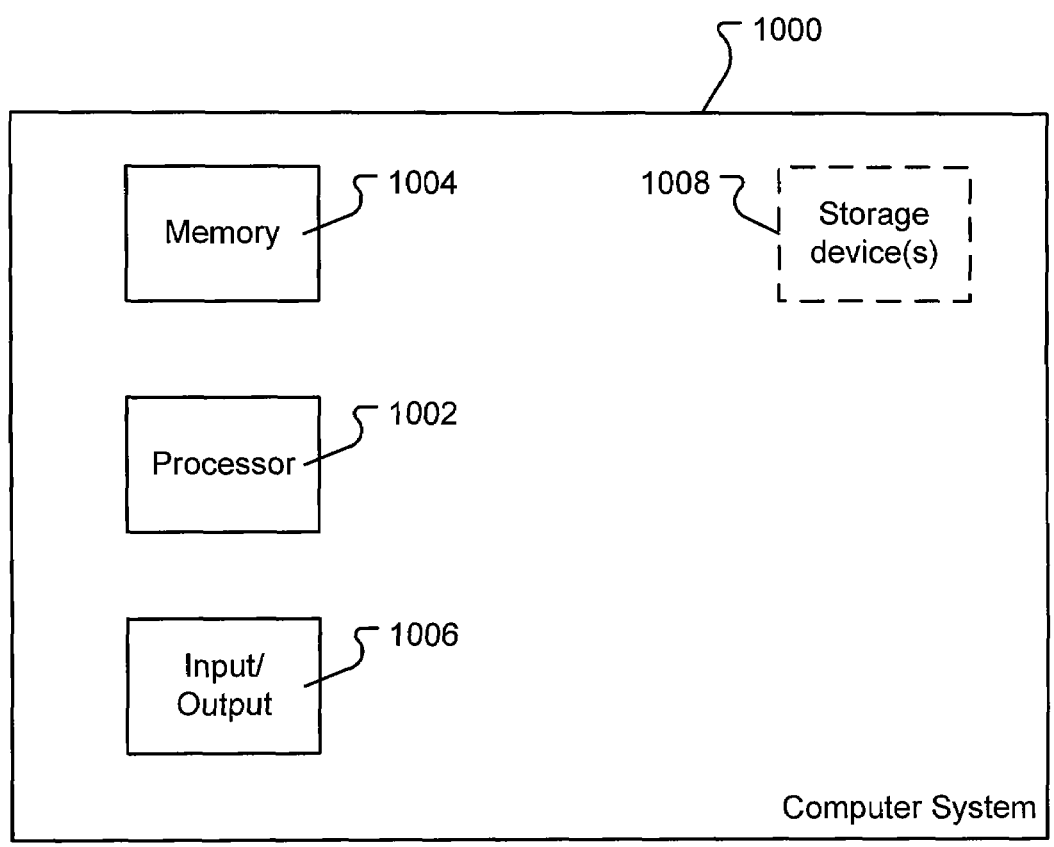
FIG. 10 is a block diagram of an embodiment of a computing or computer system operable to function as one or more systems described herein.

A computer system 1000 operable to function as one or more components or systems described herein is shown in FIG. 10. In embodiments, the computer system 1000 comprises a processor 1002 for executing one or more instructions in software stored on computer-readable medium. The instructions may perform a method, such as methods described in conjunction with FIGS. 4, 5, 6, 7, 8, and 9. The computer system, in embodiments, also includes Input/Output (I/O) devices or components 1006. The I/O components 1006 can include network interface cards, routers, hardware for communicating with peripherals (e.g., printers, monitors, etc.), software drivers, or any other hardware or software needed to receive or send information as described herein.

In one embodiment, for example, the B2B gateway 108 (FIG. 1), the suppliers 114 (FIG. 1), the buyer accounts payable 102 (FIG. 1), and other components may comprise a computing system 1000. The computer system 1000 can also comprise software elements, located within the working memory 1004 (a storage medium), including an operating system and/or other code, such as one or more application programs, which may comprise computer programs of the disclosure, and/or may be designed to implement methods of the disclosure and/or configure systems of the disclosure, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 1008 described above. In some cases, the storage medium might be incorporated within a computer system, such as the system 1004. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Also, it is noted that the embodiments may have been described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a software component, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc. Any function portion of software may be described as a component of the software system.

In light of the above description, a number of advantages of the present disclosure are readily apparent. For example, the small or medium sized business can use the B2B gateway to conduct electronic B2B payments. Past systems and methods limited smaller businesses to using credit cards or checks. With the B2B gateway, the smaller business can make ACH payments, credit card payments, check payments, or other payments using a single system. Further, the B2B gateway can interface with any buyer or supplier accounting system such that any native format document can be sent from or to the B2B gateway. Thus, the B2B gateway provides much flexibility to the buyers and suppliers in the type of accounting systems the buyers and suppliers can use without interfering with the B2B payments. Other advantages include that the buyers need not give their credit card to a supplier but can affect payment with the B2B gateway securely and not have information passed from the B2B gateway to the supplier. Likewise, the supplier need not provide a bank account number to a buyer to effectuate ACH payments. The supplier can interface securely with only the trusted B2B gateway. Without having to exchange account numbers, the buyers and suppliers avoid fraud or theft.

A number of variations and modifications of the disclosure can also be used. For example, two or more B2B gateways can be used for the payments. A load balancing across the B2B gateways can insure efficient handling of the payment messages. Further, the B2B gateway may send messages, via email, text message, or other method, to alert the buyer or supplier of the status of a payment. For example, the messages can tell the buyer or seller where the payment is currently at and what process is being completed. These messages could give the buyers and suppliers better insight into and assurance of the payments.

Other embodiments include systems to handle exceptions. For example, a buyer may send invalid credit card information or the supplier may provide an invalid ACH account number. The exceptions are determined real time and notifications of faulty numbers (corollaries to the authorization and confirmation message) can be sent to the supplier and/or buyer contemporaneously. As such, the buyers and suppliers are notified in near real time of bad transactions and can address the situations quickly. Previous systems did not alert the buyers and suppliers for days or more. Other exceptions that can have real time notice are caused by changes to an account, a rejection of payment, an account closure, or chargebacks. In some embodiments, the B2B gateway can reroute payment instructions from one account to another to avoid rejections of payments. For example, if a supplier closes one ACH account and opens a second ACH account, the B2B gateway may reroute payment instructions directed at the first account to the second account. The handling of exceptions can be completed by the same systems as shown above in similar manner as shown in the methods of FIGS. 4-9.

While various aspects of embodiments of the disclosure have been summarized above, the following detailed description illustrates exemplary embodiments in further detail to enable one of skill in the art to practice the disclosure. In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described below, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. A business-to-business gateway having one or more processors executing instructions for conducting business-to-business payments, the business-to-business gateway comprising:
   a receiver, the receiver implemented by the one or more processors and operable to receive a batch of payment instructions from one or more buyer accounts payable;
   a parser in communication with the receiver, the parser implemented by the one or more processors and operable to:
      parse the batch of payment instructions into one or more discrete payment instructions; and
      determine a batch settler to which to send the discrete payment instruction based on to which payment system the payment instruction is directed and on information in the payment instruction;
   one or more batch settlers in communication with the parser, each of the one or more batch settlers associated with a payment system, the one or more batch settlers implemented by the one or more processors and operable to:
      receive the one or more discrete payment instructions and batch one or more payment instructions common to a supplier of a product or service; and
      batch the one or more payment instructions common to a supplier of product or service into a payment batch; and
   one or more senders, the one or more senders in communication with one or more of the batch settlers, the one or more senders implemented by the one or more processors and operable to send the one or more payment instructions to one or more suppliers of a product or service, the one or more senders operable to send one or more payment instructions over one of the one or more payment systems.

2. The business-to-business gateway as defined in claim 1, the sender operable to send the payment batch to the supplier of product or service.

3. The business-to-business gateway as defined in claim 1, wherein a first batch settler is associated to an ACH payment system and a second batch settler is associated with a credit card platform system.

4. The business-to-business gateway as defined in claim 1, wherein the batch of payment instructions is in a native format.

5. The business-to-business gateway as defined in claim 4, further comprising a first translator in communication with the receiver and the parser, the first translator operable to receive the payment batch from the receiver, the first translator operable to translate the payment batch from the native format into a standard format, the first translator operable to send the parser the payment batch in the standard format.

6. The business-to-business gateway as defined in claim 1, wherein the one or more payment instructions sent to the one or more suppliers of product or service are in a native format.

7. The business-to-business gateway as defined in claim 6, further comprising a second translator in communication with one or more of the batch settlers and the one or more senders, the second translator operable to receive the one or more discrete payment instructions from the one or more batch settlers, the second translator operable to translate the one or more discrete payment instructions from a standard format into the native format, the second translator operable to send the one or more discrete payment instructions in the native format.

8. The business-to-business gateway as defined in claim 1, further comprising:
   one or more second receivers, the one or more second receivers operable to receive a one or more authorization or confirmation messages from one or more suppliers of a product or service;
   one or more third translators in communication with the one or more second receivers, the one or more third translators operable to receive the one or more authorization or confirmation messages from the one or more second receivers, the third translator operable to translate the one or more authorization or confirmation messages from a native format into a standard format;
   one or more batch reporters in communication with the one or more third translators, each of the one or more batch reporters associated with a payment system, the one or more batch reporters operable to receive the one or more authorization or confirmation messages, the one or more batch reporters operable to determine one or more authorization or confirmation messages associated with a buyer, the one or more batch reporters operable to batch the one or more authorization or confirmation messages associated with the buyer into a batch;
   a fourth translator in communication with one or more of the batch reporters, the fourth translator operable to receive the batched authorization or confirmation messages from the one or more batch reporters, the fourth translator operable to translate the batched authorization or confirmation messages from the standard format into a native format, the fourth translator operable to send the batched authorization or confirmation messages in the native format; and
   a second sender, the second sender in communication with one or more of the batch reporters, the second sender operable to send the batched authorization or confirmation messages to the one or more buyer accounts payable.

9. A business-to-business gateway having one or more processors executing instructions for conducting business-to-business payments, the business-to-business gateway comprising:
   a receiver, the receiver implemented by the one or more processors and operable to receive a batch of payment instructions from one or more buyer accounts payable;
   a parser in communication with the receiver, the parser implemented by the one or more processors and operable to:
      parse the batch of payment instructions into one or more discrete payment instructions; and
      determine a batch settler to which to send the discrete payment instruction based on to which payment system the payment instruction is directed and on information in the payment instruction;
   one or more batch settlers in communication with the parser, each of the one or more batch settlers associated with a payment system, the one or more batch settlers implemented by the one or more processors and operable to:

receive the one or more discrete payment instructions and operable to batch one or more payment instructions common to a supplier of a product or service into a payment batch;

batch the one or more payment instructions common to a supplier of product or service into a payment batch; and one or more senders, the one or more senders in communication with one or more of the batch settlers, the one or more senders implemented by the one or more processors and operable to send the one or more payment instructions to one or more suppliers of a product or service, the one or more senders operable to send one or more payment instructions over one of the one or more payment systems.

10. A business-to-business gateway having one or more processors executing instructions for conducting business-to-business payments, the business-to-business gateway comprising:

a receiver, the receiver implemented by the one or more processors and operable to receive a batch of payment instructions in a native format from one or more buyer accounts payable, the native format required by the one or more buyer accounts payable;

a parser in communication with the receiver, the parser implemented by the one or more processors and operable to:

parse the batch of payment instructions into one or more discrete payment instructions;

determine a batch settler to which to send the discrete payment instruction based on to which payment system the payment instruction is directed and on information in the payment instruction;

one or more batch settlers in communication with the parser, each of the one or more batch settlers associated with a payment system, the one or more batch settlers implemented by the one or more processors and operable to:

receive the one or more discrete payment instructions and operable to batch one or more payment instructions common to a supplier of a product or service into a payment batch;

batch the one or more payment instructions common to a supplier of a product or service into a payment batch;

a first translator in communication with the receiver and the parser, the first translator operable to receive the payment batch from the receiver, the first translator operable to translate the payment batch from the native format into a standard format that is different than the native format, the first translator operable to send to the parser the payment batch in the standard format; and one or more senders, the one or more senders in communication with one or more of the batch settlers, the one or more senders implemented by the one or more processors and operable to send the one or more payment instructions to one or more suppliers of a product or service, the one or more senders operable to send one or more payment instructions over one of the one or more payment systems.

11. The business-to-business gateway of claim 10, wherein the first translator is operable to translate the payment batch from the native format into a standard format by one or more of:

changing the order of information, changing the size of the instruction, and changing the content from one form to another form.

* * * * *